United States Patent
Ford et al.

(10) Patent No.: US 9,145,108 B2
(45) Date of Patent: Sep. 29, 2015

(54) RESTRAINT PRETENSIONER WITH DEACCELERATION MECHANISM

(75) Inventors: Brian Ford, Seminole, FL (US); Justin Robinson, Parrish, FL (US); Don Blackman, Bradenton, FL (US); Andre Coumand, Safety Harbor, FL (US); Hugo Granados, Trinity, FL (US)

(73) Assignee: Carleton Life Support Systems, Inc., Davenport, IA (US)

( * ) Notice: Subject to any disclaimer, the term of this patent is extended or adjusted under 35 U.S.C. 154(b) by 764 days.

(21) Appl. No.: 13/150,473

(22) Filed: Jun. 1, 2011

(65) Prior Publication Data
US 2012/0305694 A1 Dec. 6, 2012

(51) Int. Cl.
*B60R 22/46* (2006.01)
*B64D 25/06* (2006.01)
(52) U.S. Cl.
CPC ............ *B60R 22/4633* (2013.01); *B64D 25/06* (2013.01)
(58) Field of Classification Search
CPC ............ B60R 22/4628; B60R 22/4633; B60R 2022/469; B60R 2022/4695; B64D 25/04; B64D 25/06; B64D 2011/0668
USPC .................... 242/374; 280/806, 807; 297/480; 60/636, 638
See application file for complete search history.

(56) References Cited

U.S. PATENT DOCUMENTS

| | | | |
|---|---|---|---|
| 3,893,298 A * | 7/1975 | Williams | 60/635 |
| 4,667,601 A | 5/1987 | Diamond et al. | |
| 5,794,876 A * | 8/1998 | Morizane et al. | 242/374 |
| 6,155,512 A | 12/2000 | Specht et al. | |
| 6,318,662 B1 | 11/2001 | Hori et al. | |
| 6,698,677 B1 | 3/2004 | Happ et al. | |
| 2004/0169105 A1* | 9/2004 | Wier | 242/374 |
| 2005/0211816 A1* | 9/2005 | Takamatsu et al. | 242/374 |
| 2006/0144983 A1* | 7/2006 | Kitazawa et al. | 242/374 |
| 2007/0241223 A1* | 10/2007 | Boelstler et al. | 242/374 |

FOREIGN PATENT DOCUMENTS

| | | |
|---|---|---|
| EP | 0980799 | 2/2000 |
| WO | 2004/043749 | 5/2004 |
| WO | 2009/020500 | 2/2009 |

* cited by examiner

*Primary Examiner* — Emmanuel M Marcelo
*Assistant Examiner* — Angela Caligiuri
(74) *Attorney, Agent, or Firm* — Woods Oviatt Gilman LLP; Katherine H. McGuire, Esq.

(57) ABSTRACT

Disclosed is a pretensioner for an occupant restraint. The pretensioner is designed to be used in conjunction with an inertial reel that locks the occupant restraint when detecting an adverse event. The pretensioner acts to remove slack in the webbing of the restraint and thereby safely secure the occupant once the reel is locked. The pretensioner described herein includes a rack that is initially held in place by a shear pin. Upon being activated, the rack is forced to a fully extended orientation, whereby the shear pin is severed. A deceleration ramp in included beneath the rack to slowly bring the rack to a stop at the end of the stroke.

20 Claims, 6 Drawing Sheets

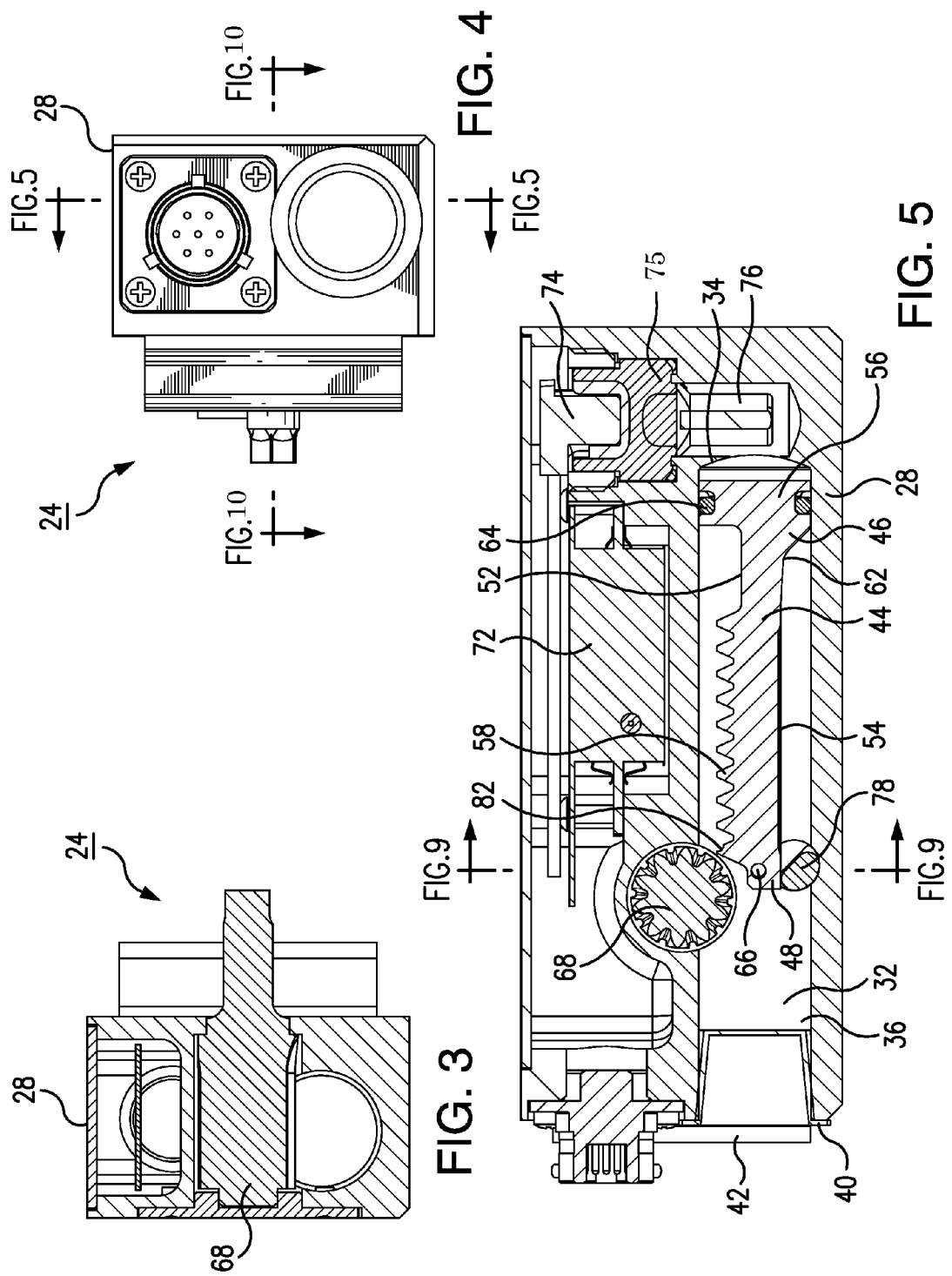

RESTRAINT PRETENSIONER WITH DEACCELERATION MECHANISM

BACKGROUND OF THE INVENTION

1. Field of the Invention

This invention relates to a restraint pretensioner. More particularly, the present invention relates to a restraint pretensioner with a deceleration mechanism.

2. Description of the Background Art

A wide variety of vehicles use passive-safety devices such as restraints and harnesses. These systems are especially important for fast moving vehicles. Restraint systems in fast moving vehicles must be capable of fast actuation in order to lessen the severity of potential undesirable events.

Fast moving vehicles can subject the occupants to large accelerations/decelerations during unexpected, undesirable events, such as a violent maneuver or a crash. These accelerations/decelerations can lead to large displacements of the occupant's body, which can result in the occupant's body or head contacting structure or objects within the vehicle. This can result in serious injuries or possibly death. Specially designed seats and restraint systems are typically used to restrain the occupant, however, excessive body displacement can still occur during the undesirable events due to the wide range of human body types and sizes.

Restraint systems include inertia reels that are designed to prevent movement of the body during normal operation of the vehicle—such as reaching with the arms and turning of the torso. The inertia reels are also designed to lock (preclude webbing payout from the housing) when large accelerations or decelerations are detected. This minimizes the displacement of the seated occupant's body to mitigate the potential for injury. Furthermore, the seated occupant is sometimes out of position or engaged in reaching or turning motions during the onset of an undesirable event.

Even a securely restrained occupant seated firmly against the seatbelt with the restraint and inertia reel functioning perfectly, can still experience significant displacement (depending upon the severity of the event) and be seriously injured. This displacement can be the result of initial slack of the wound restraint, the compaction of the webbing on the inertia reel shaft, and/or induced stretch of the webbing material. Such displacement of a wound webbing is known as "pack down" or "film spool."

Over the years, various types of pretensioners have been developed to eliminate or minimize webbing displacement. One example is disclosed in U.S. Pat. No. 6,698,677 to Happ et al. The pretensioner includes a pivotal rack arm and a piston with an integral rack. The rack arm precludes the linear movement of the piston prior to the pretensioner being activated. After the pretensioner is activated, the rack arm restrains the piston by engaging a pocket within the bottom of the piston.

The device described in Happ '677 is intended to automatically retract the restraint webbing early in the event. By doing so, undesirable slack is removed and after the webbing is tightened, the occupant is held in the ideal upright seated posture, thereby minimizing the potential for serious injury. The device may be mounted directly to an existing inertia reel in the case of a retrofit, or configured as an integral feature of the inertia reel itself. Furthermore, the device is designed so that actuation will not injure the occupant it is intended to protect and ensure a safe exit from the vehicle after a crash. Also, non-crash, inadvertent actuation will not inhibit the occupant's ability to continue to safely operate the vehicle, which is particularly crucial in aviation applications.

Another example is illustrated in U.S. Pat. No. 6,155,512 to Specht et al. Specht '512 discloses a seat belt pretensioner that includes a piston-like drive member arranged in a glide tube. A drive means produces a propellant gas that drives the drive member. A movement transmitting system connects the drive member to the seat belt. A discharge system with a release or rupture element opens a discharge orifice in the drive member during a return movement of the drive member.

Some pretensioners, however, suffer from bounce back. This occurs when an internal piston rebounds after reaching the end of its stroke. Bounce back can have the undesirable result of the rack re-engaging an pinion gear or otherwise interfering with the proper operation of an interconnected inertial reel.

SUMMARY OF THE INVENTION

One of the advantages of the disclosed pretensioner is that it eliminates, or greatly reduces, bounce back.

Yet another advantage is realized by providing a pretensioner with a deceleration ramp, whereby the rack is brought to a gradual stop at the end of its stroke.

Another possible advantage of the disclosed pretensioner is that once the rack is positioned in a fully deployed position, it does not interfere with the operation of the associated pinion gear.

The disclosed pretensioner also has the advantage of being compact in size by orienting an associated initiator perpendicular to the longitudinal axis of the rack.

Another advantage is realized via the use of a shear pin that secures the rack prior to the pretensioner being activated.

A further advantage is provided by providing a closure at the end of the bore within which the rack travels.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 3 is a cross-sectional view taken along line 3-3 of FIG. 2.

FIG. 4 is an end view of the restraint pretensioner

FIG. 5 is a cross sectional view of the pretensioner with the rack in the un-extended orientation and taken along line 5-5 of FIG. 4.

Similar reference characters refer to similar parts throughout the several views of the drawings.

DETAILED DESCRIPTION OF THE PREFERRED EMBODIMENT

The present invention relates to a pretensioner for an occupant restraint. The pretensioner is designed to be used in conjunction with an inertial reel that locks the occupant restraint when detecting an adverse event. The pretensioner acts to remove slack in the webbing of the restraint and thereby safely secure the occupant once the reel is locked. The pretensioner described herein includes a rack that is initially held in place by a shear pin. Upon being activated, the shear pin is broken and the rack is forced to a fully extended orientation. A deceleration ramp in included beneath the rack to slowly bring the rack to a stop at the end of the stroke. The various components of the pretensioner are described in greater detail hereinafter.

Figure 1:
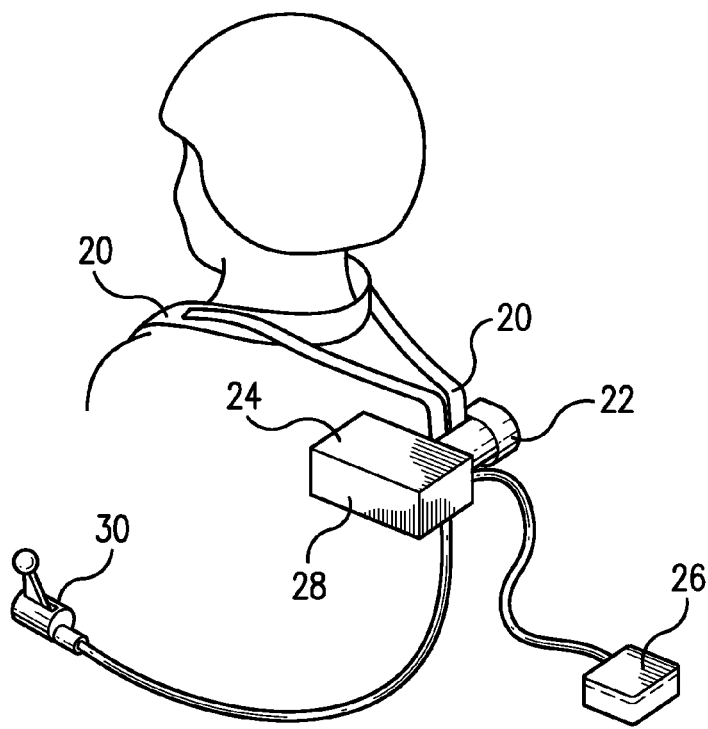
FIG. 1 is a view of the harness, inertial reel, and pretensioner.
Figure 2:
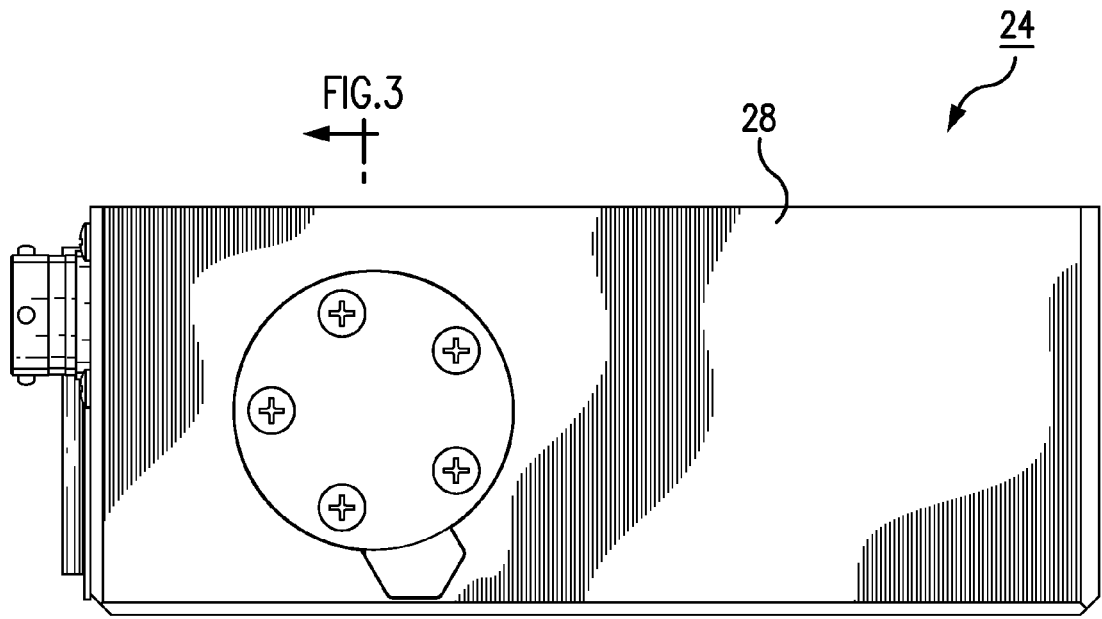
FIG. 2 is a side elevational view of the restraint pretensioner.

The general environment in which the restraint pretensioner of the present invention is used is illustrated in FIG. 1. An occupant restraint 20, which typically includes a harness, can be tightened by inertia reel 22 which is rigidly attached to the seat or some other portion of the vehicle structure. The pretensioner 24 may be an integral part of the inertial reel and a crash sensor 26 (similar to the one embodied in U.S. Pat. No. 6,299,102, which is incorporated by reference herein). Crash sensor 26 is rigidly attached to the vehicle structure and located as close as possible to the occupant(s) to ensure accurate sensing of the accelerations (either positive or negative) actually experienced by the occupant(s). A reset lever 30 is provided for resetting inertial reel 22 after an event. Pretensioner 24 operates to take excess slack from restraint 20. Pretensioner 24 may operate before or after inertial reel 22 locks restraint 20.

Pretensioner 24 includes a housing 28 with an internal bore 32 that is preferably cylindrical in shape. As noted in FIG. 5, bore 32 has both proximal and distal ends (34 and 36). A fluid port 38 (note FIG. 6) is formed within the proximal end 34 and an opening 40 is formed at the distal end 36. An end cap 42 is frictionally fitted into the opening 40 to protect the internal components of pretensioner 24 prior to activation.

Figure 9:
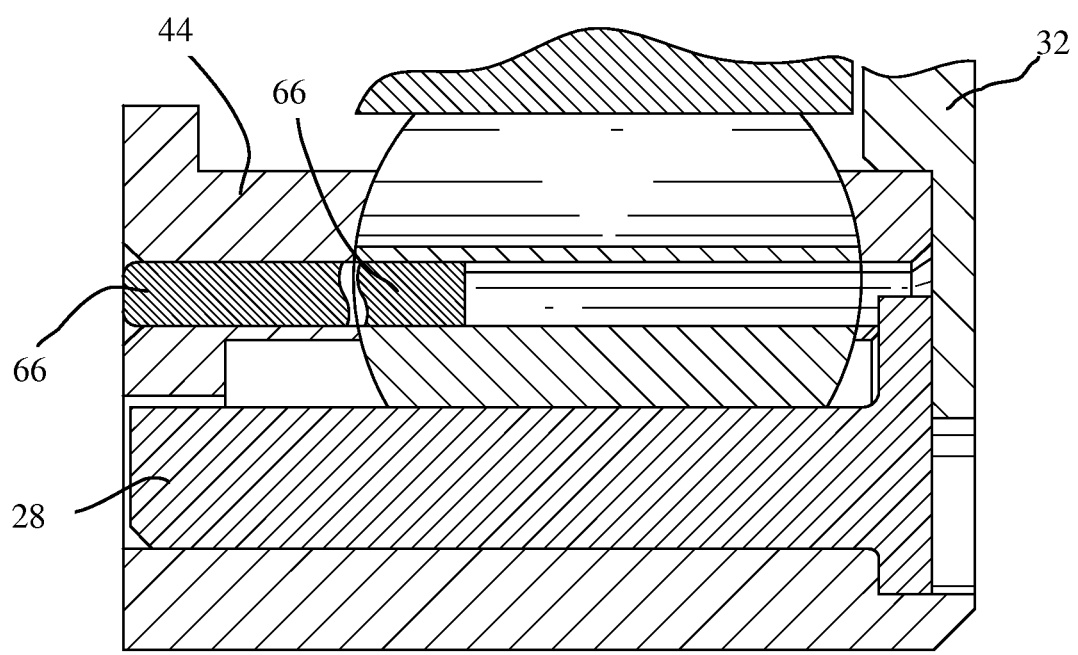
FIG. 9 is a detailed view of a shear pin used to secure the deceleration ramp taken along line 9-9 of FIG. 5.
Figure 10:
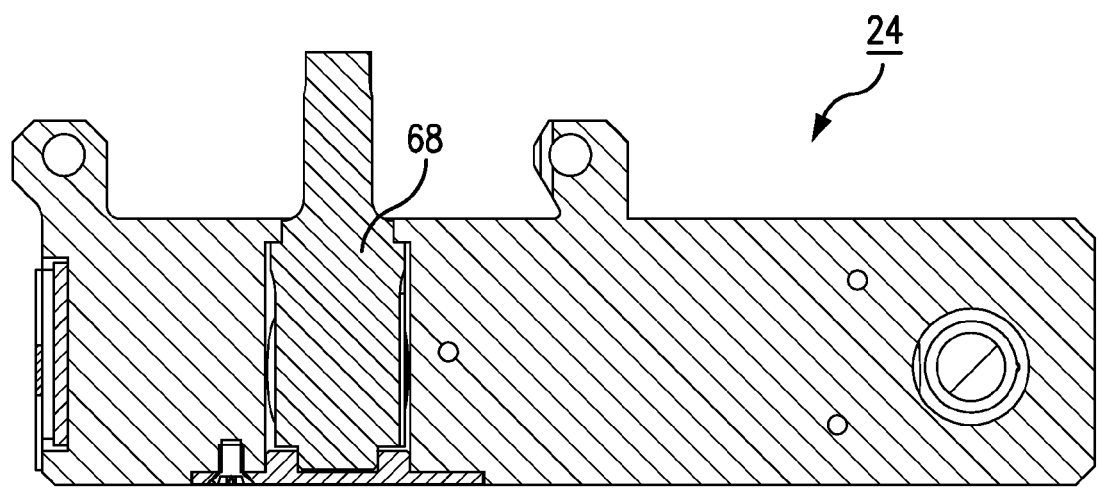
FIG. 10 is cross sectional view taken along line 10-10 of FIG. 4.
Figure 11:
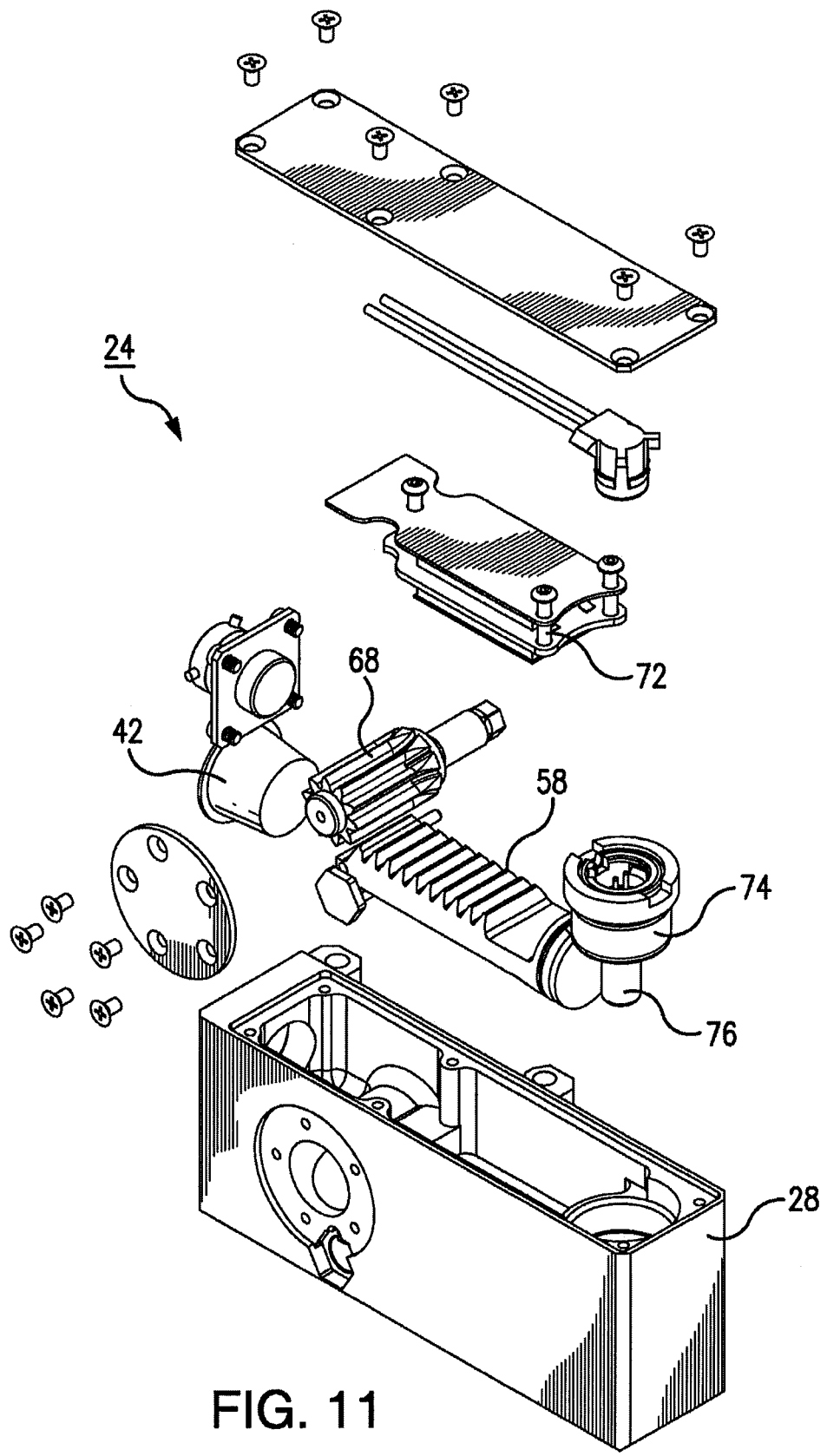
FIG. 11 is an exploded view of the pretensioner.

A rack 44 is mounted within bore 32. Rack 44 includes an elongated shaft with proximal and distal ends (46 and 48) and upper and lower surfaces (52 and 54). A piston 56 is formed at the proximal end of the rack. Teeth 58 are formed along the upper surface of the rack. Rack 44, however, includes toothless regions at its proximal and distal ends (46 and 48). The lower surface 54 of rack 44 includes an angled surface 62 that is positioned adjacent the rack's proximal end 46. An O-ring 64 is positioned within a channel that extends about the perimeter of piston 56. O-ring 64 forms a fluid tight seal between piston 56 and the surrounding bore 32. A shear pin 66 is also included at the distal end 48 of rack 44. One end of shear pin 66 is secured to rack 44 while the opposite end is secured to bore 32. Shear pin 66 initially acts to retain rack 44 in an un-extended orientation. However, shear pin 66 is frangible and shears upon rack 44 moving in response to fluid pressure (FIG. 9). Shear pin 66 can be brass to facilitate proper shearing. Alternatively, a ball and detent can be used in lieu of a shear pin.

Figure 6:
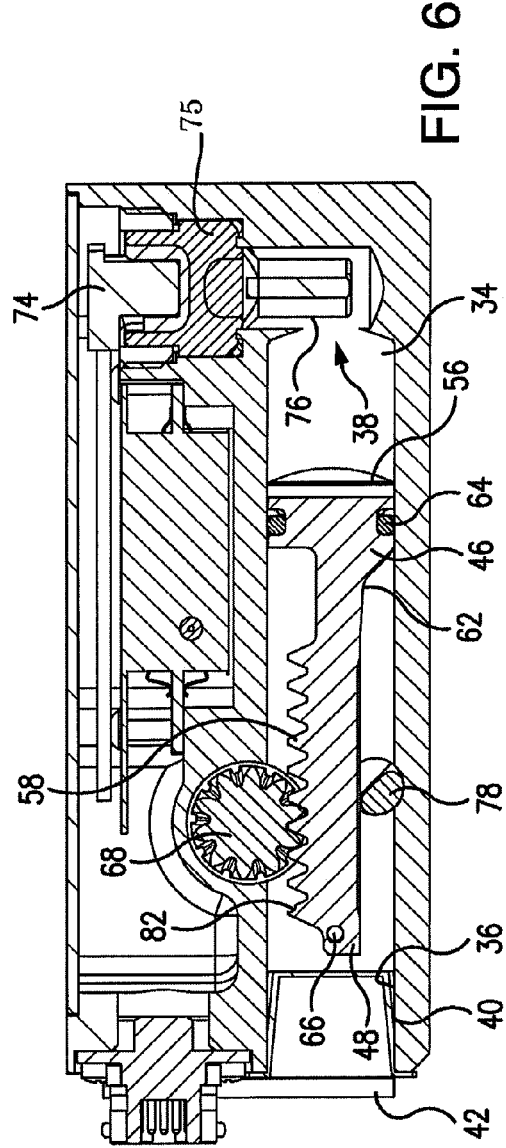
FIG. 6 is a cross sectional view of the pretensioner with the rack engaged with the pinion.

As noted by FIG. 6, as rack 44 moves linearly towards the extended orientation, teeth 58 engage a pinion gear 68 mounted within housing 28. Pinion gear 68 is directly coupled to the inertia reel's webbing shaft through a drive shaft and coupler (not shown). Rotation of the inertia reel's webbing shaft, in turn, forcibly back-drives the occupant restraint webbing on the webbing shaft, activating the inertia reel's automatic locking feature and maintaining the occupant in the optimum upright seated position to withstand the high acceleration of the event.

Excessive acceleration detected by crash sensor 26 sends an activation signal to pretensioner 24. The signal can be generated by a restraint control module mounted either inside or outside pretensioner 24. Crash sensor 26 uses sensors (such as accelerometers) and a CPU implemented algorithm to determine whether a crash event is occurring. The activation signal is received by electronic circuit board 72 (shown in FIG. 5) located within pretensioner 24. Sensor 26 can provide both a control signal and power to board 72. Electronic circuit board 72 includes, among other components, electrical capacitors where sufficient electrical energy can be stored to trigger an initiator 75, which may be a pyrotechnic gas-dispensing cartridge or squib contained within, or attached to, pretensioner 24. A pressure chamber 76 is associated with initiator 75. The cartridge or squib may be activated by a bridge wire that initiates a chemical reaction. Alternatively, electrical energy from board 72 can be used to open a valve which allows compressed gas to flow from a separate reservoir. In yet another alternative embodiment, air is supplied via an external air supply, such as the bleed air of the aircraft.

Circuit board 72 can include on board diagnostics to check the state of initiator 75 and components upon board 72. An audible or visual error signal can be sent to the operator in the event a malfunction is detected. Circuit board 72 and initiator 75 communicate via an electrical connector 74.

Initiator 75 and chamber 76 are formed within pretensioner 24 adjacent the proximal end 34 of bore 32. In order to minimize the size and profile of housing 28, initiator 75 and pressure chamber 76 are oriented perpendicular to bore 32. Namely, the longitudinal axis of chamber 76 is at a right angle to the longitudinal axis of bore 32.

In the embodiment shown in FIG. 5, the stored electricity from the capacitor is delivered to initiator 75. The electricity from the capacitor is sufficient to activate initiator 75. Once activated, initiator 75 delivers a fluid or gas downwardly into chamber 76. This fluid is then delivered through fluid port 38 and contacts piston 56. The released gas pressurizes chamber 76 almost instantaneously, causing piston 56 to move rapidly within the bore 32 and housing 28. The O-ring 64 around the piston minimize leakage and ensures the force of the fluid is fully delivered to rack 44.

Figure 7:
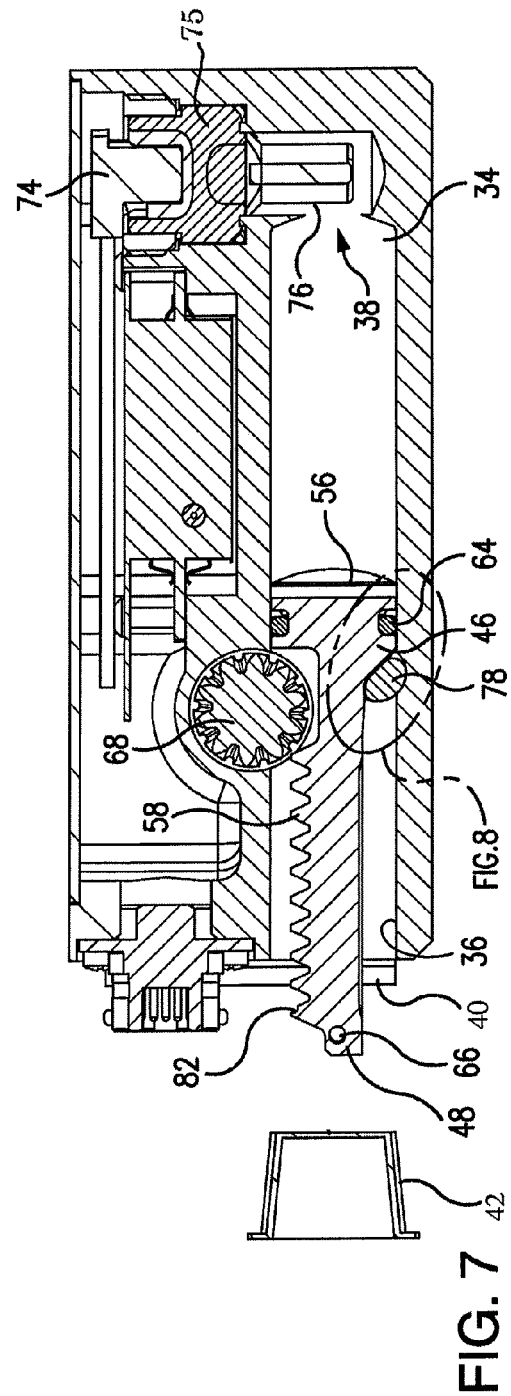
FIG. 7 is a cross sectional view of the pretensioner with the rack in the extended orientation.
Figure 8:
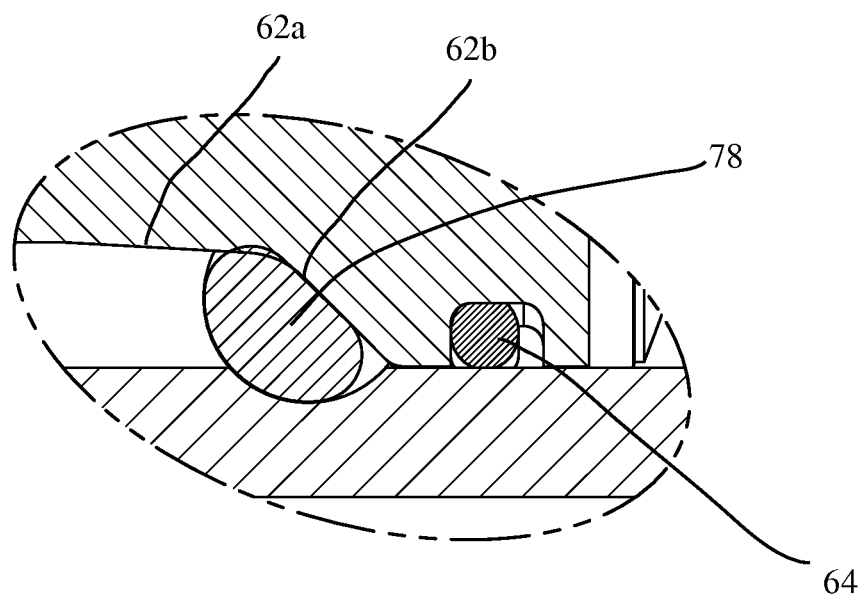
FIG. 8 is a detailed view of a deceleration ramp taken from FIG. 7.

Prior to actuation, rack 44 is initially prevented from movement by shear pin 66. In this un-extended orientation, rack 44 is also disengaged from pinion gear 68 within housing 28 (note FIG. 5). As such, pinion gear 68 is able to rotate freely within the forward toothless region on rack 44. As the inertia reel's webbing shaft turns, pinion gear 68 turns freely whenever the webbing is retracted or "paid out." That is, the teeth of rack 44 are not in engagement with teeth 58 of pinion gear before mechanism actuation. Rack 44 is similarly disengaged from pinion 68 when in the fully extended orientation via the rearward toothless region (note FIG. 7).

As rack 44 moves linearly between its un-extended and fully extended orientations (note FIG. 6), and in response to fluid from chamber, pinion 68 is engaged by rack 44. As such, pinion 68 rotates the inertial locking reel 22 to thereby remove any excess lack in the webbing. In this manner, the webbing is pretensioned prior to—or after—being locked by inertial reel 22. When in the fully extended orientation, rack 44 disengages end cap 42 and extends beyond the distal end 36 of bore 32.

As rack 44 reaches the end of its stroke, a deceleration ramp 78 positioned beneath rack 44 engages the angled surface 62 on the underside 54 of rack 44. Deceleration ramp 78 includes an angled surface with rounded edges. The angled surface of ramp 78 sequentially engages two portions 62a and 62b of surface 62. Portion 62b has a slightly greater angle than 62a. As such, as ramp 78 first engages portion 62a an interference is achieved that slows the travel of rack 44. Thereafter, as ramp 78 engages portion 62b, rack 44 is brought to a gentle stop. With rack 44 in the fully extended orientation, ramp 78 is wedged beneath rack 44 to effectively prevent further movement of rack 44. The interference between ramp 78 and portion 62b thereby eliminates, or greatly lessens, the potential for rack 44 to bounce back or rebound at the end of the stroke.

In an alternative embodiment, a compressed gas system can be used in lieu of a pyro. In another embodiment, pretensioner could be equipped with a small pressure intensifier driven by electronic circuit board. The pressure intensifier can refill a pressure reservoir after each actuation (opening the release valve) permitting the system to be "recyclable." Recycling the system permits the use of lower actuation thresholds for the crash sensor, allowing system operation in "marginal" events without loss of capability or the primary objective (crash events). The pressure intensifier is a small, reciprocating, piston-type pump which draws in ambient air and forces it into the reservoir until the desired pressure is reached. Subsequent on/off cycles can be used to maintain the reservoir at the desired pressure negating the need for hermetic sealing, which would be particularly difficult for the release valve.

Another feature of this design is that the first tooth of rack 82 is modified from the standard tooth profile by the removal of a portion of the trailing surface. In the rare instance of a precise initial tip alignment of the first tooth 82 with a tooth of pinion gear (which could prevent the teeth from engaging), this feature ensures that the gear teeth do not lock as engagement is attempted. This could render the device inoperable and potentially trap the seated occupant in the occupant restraint system. In this case, the modified portion of the tooth will shear, allowing the remaining portion to align and complete the tooth engagement sequence. In addition, the tips of all teeth are smoothly contoured in order to maximize synchronous and smooth engagement.

Yet another feature of the present design is the addition of a means for venting the post-actuation chamber pressure. After the pretensioning event is completed, the internal gas pressure in chamber can be vented through a spring loaded pressure relief valve (not shown). Alternatively, an optional small diameter orifice can be used to relieve the pressure within chamber. Venting or relieving the internal pressure effectively eliminates any forces between the teeth of rack and pinion gear, which could prohibit coupler from decoupling once the pretensioning event is completed. The proper venting of post-actuation chamber pressure is also important to avoid injury to workers servicing the unit.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A pretensioner for tightening an occupant restraint, the pretensioner interconnected to an inertial reel, the inertial reel locking the occupant restraint when provided with a locking signal, the pretensioner comprising:

a pretensioner body having an internal cylindrical bore with proximal and distal ends, a fluid port at the proximal end and an opening at the distal end, a removable end cap frictionally fitted within the opening;

a rack comprising an elongated shaft having proximal and distal ends and upper and lower surfaces, the upper surface portion of the shaft having teeth formed there along, the lower surface of the shaft having a horizontally planar portion and an obtusely angled surface portion adjacent the proximal end, a piston formed at the proximal end of the shaft, a shear pin mounted to the distal end of the shaft, the rack having un-extended and extended orientations;

an initiator and pressure chamber housed in said pretensioner body adjacent the proximal end of the bore, the pressure chamber being perpendicular to the bore and in communication with the fluid port, the initiator having an activated state wherein fluid is delivered into the pressure chamber, through the fluid port, and against the piston, whereby the rack is moved from the un-extended to the extended orientation, movement of the rack to the extended orientation severing the shear pin and ejecting the end cap;

a pinion held on a pinion shaft rotatably supported within the pretensioner body, the pinion shaft being connectable to the inertial locking reel, the pinion being disengaged from the rack with the rack in the un-extended and extended orientations, the pinion engaging the rack as the rack is moved between the un-extended to the extended orientation;

a fixed deceleration ramp positioned within the bore and in slidable contact with the lower surface of the rack, the deceleration ramp having an angled surface in a first orientation, the angled surface of the deceleration ramp interfering with the lower surface of the rack, whereby as the angled surface of the deceleration ramp engages the obtusely angled surface portion of the rack, the rack is slowed prior to reaching the extended orientation and whereby as the rack reaches its extended orientation the fixed deceleration ramp remains in the first orientation and locks the rack in the extended orientation while minimizing bounce back of the rack.

2. A pretensioner for tightening an occupant restraint, the pretensioner comprising:

a pretensioner body having an internal bore with proximal and distal ends, a fluid port at the proximal end;

a rack comprising an elongated shaft having proximal and distal ends and upper and lower surfaces, the upper surface of the shaft having teeth formed there along, the lower surface of the shaft having a horizontally planar portion and a first obtusely angled surface portion depending therefrom adjacent the proximal end, a piston formed at the proximal end of the shaft, the rack having un-extended and extended orientations;

an initiator housed in said pretensioner body adjacent the proximal end of the bore, the initiator having an activated state wherein fluid is delivered against the piston, whereby the rack is moved from the un-extended to the extended orientation;

a pinion held on a pinion shaft rotatably supported within the pretensioner body, the pinion being disengaged from the rack with the rack in the un-extended and extended orientations, the pinion engaging the rack as the rack is moved between the un-extended to the extended orientation;

a fixed deceleration ramp positioned within the bore and in slidable contact with the lower surface of the rack, the deceleration ramp having an angled surface in a first orientation, the angled surface of the deceleration ramp interfering with the lower surface of the rack, whereby as the angled surface of the deceleration ramp engages the first obtusely angled surface portion of the rack, the rack is slowed prior to reaching the extended orientation and whereby as the rack reaches its extended orientation the fixed deceleration ramp remains in the first orientation and locks the rack in the extended orientation while minimizing bounce back of the rack.

3. The pretensioner as described in claim 2 further comprising an opening at the distal end of the bore and wherein a removable cap is fitted over the opening.

4. The pretensioner as described in claim 3 wherein the cap is ejected from the opening upon the rack achieving its extended orientation.

5. The pretensioner as described in claim 2 wherein a pressure chamber is positioned beneath the initiator and wherein fluid from the initiator is delivered downwardly into the chamber.

6. The pretensioner as described in claim 5 wherein the initiator and the pressure chamber are orientated at a 90 degree angle to the bore.

7. The pretensioner as described in claim 2 wherein the deceleration ramp is locked underneath the rack when the rack is in its extended orientation.

8. The pretensioner as described in claim 2 wherein the rack is interconnected to an inertial reel.

9. The pretensioner as described in claim 2 wherein the lower surface of the rack includes a second obtusely angled surface portion, and wherein when the fixed deceleration ramp engages the first obtusely angled surface portion movement of the rack is slowed and when the deceleration ramp engages the second obtusely angled surface portion the movement of the rack is stopped and the rack is locked in the extended orientation by the fixed deceleration ramp and bounce back is minimized.

10. A pretensioner for tightening an occupant restraint, the pretensioner comprising:

a pretensioner body having an internal bore with proximal and distal ends, a fluid port at the proximal end;

a rack comprising an elongated shaft having proximal and distal ends and upper and lower surfaces, the upper surface of the shaft having teeth formed there along, the rack having un-extended and extended orientations;

an initiator housed in said pretensioner body adjacent the proximal end of the bore, the initiator having an activated state wherein fluid is delivered against a piston, whereby the rack is moved from the un-extended to the extended orientation when the initiator is activated;

a pinion held on a pinion shaft rotatably supported within the pretensioner body; a fixed deceleration ramp having a first orientation positioned within the bore and in slidable contact with the lower surface of the rack when the rack is in its un-extended orientation, the deceleration ramp remaining in the first orientation and locking the rack in its extended orientation and minimizing bounce back following activation of the initiator.

11. The pretensioner as described in claim 10 wherein the lower surface of the rack has a horizontally planar portion and a first obtusely angled surface portion depending therefrom.

12. The pretensioner as described in claim 11 wherein as the deceleration ramp engages the first obtusely angled surface portion of the rack, the rack is slowed prior to reaching the extended orientation.

13. The pretensioner as described in claim 11 wherein the lower surface of the rack further includes a second obtusely angled surface portion depending from the first obtusely angled surface portion adjacent the proximal end of the rack, and wherein when the deceleration ramp engages the second obtusely angled surface portion the movement of the rack is stopped.

14. The pretensioner as described in claim 10 wherein a pressure chamber is positioned beneath the initiator and wherein fluid from the initiator is delivered downwardly into the chamber.

15. The pretensioner as described in claim 14 wherein the initiator and the pressure chamber are orientated at a 90 degree angle to the bore.

16. The pretensioner as described in claim 10 further comprising an opening at the distal end of the bore and wherein a removable cap is fitted over the opening.

17. The pretensioner as described in claim 10 wherein the pinion engages the rack.

18. The pretensioner as described in claim 17 wherein the rack includes toothless portions at the proximal and distal ends.

19. The pretensioner as described in claim 18 wherein the pinion is disengaged from the rack when the pinion is positioned over the toothless portions.

20. The pretensioner as described in claim 19 wherein the pinion is interconnected to an inertial reel.

* * * * *